H. MESSMAN.
DRAFT MECHANISM.
APPLICATION FILED OCT. 10, 1908.
918,183.
Patented Apr. 13, 1909.
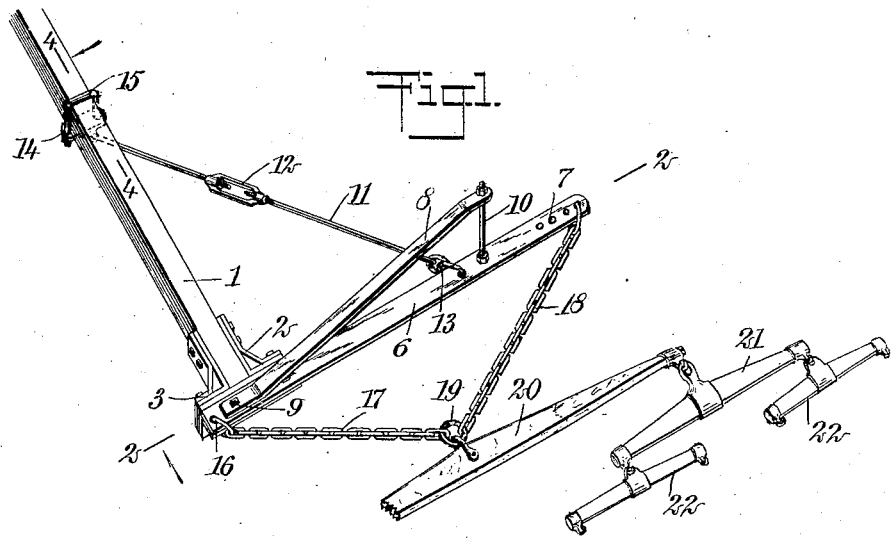
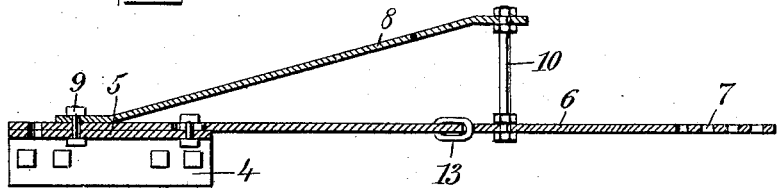
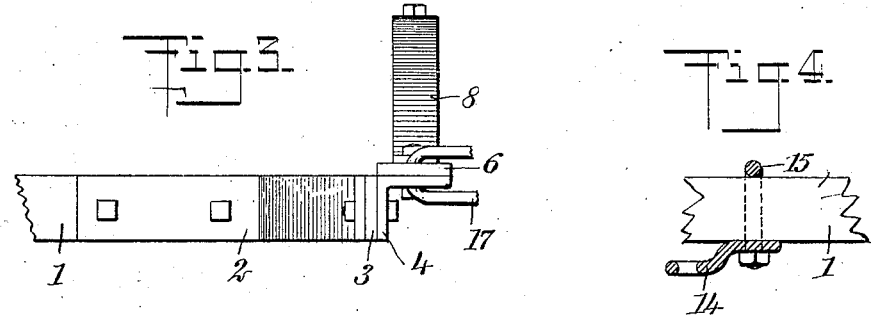
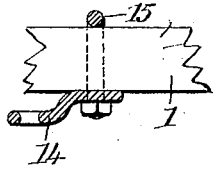
WITNESSES
INVENTOR
Herman Messman
BY
ATTORNEYS

UNITED STATES PATENT OFFICE.

HERMAN MESSMAN, OF JEFFERSON TOWNSHIP, NEWTON COUNTY, INDIANA.

DRAFT MECHANISM.

No. 918,183.          Specification of Letters Patent.          Patented April 13, 1909.

Application filed October 10, 1908. Serial No. 457,186.

*To all whom it may concern:*

Be it known that I, HERMAN MESSMAN, a citizen of the United States, and a resident of Jefferson township, in the county of Newton and State of Indiana, have invented a new and Improved Draft Mechanism, of which the following is a full, clear, and exact description.

This invention relates to draft mechanism or draft equalizers, such as used for attaching draft animals to a sulky plow.

The object of the invention is to provide a draft mechanism of simple construction, by means of which four horses may be attached to a plow in such a way that none of the horses will be obliged to step in the soft plowed ground. In other words, the mechanism affords means for attaching the horses in a laterally displaced position toward the land.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a perspective showing the draft mechanism attached to the forward end of the plow beam, certain parts of the mechanism being broken away; Fig. 2 is a section taken on the line 2—2 of Fig. 1, and further illustrating the construction; Fig. 3 is a side elevation of the forward end of the plow beam, and showing the manner of attaching the draft mechanism thereto; and Fig. 4 is a section taken on the line 4—4 of Fig. 1, and illustrating the manner of attaching an anchor plate for a brace.

Referring more particularly to the parts, 1 represents the beam of the plow. The end of this beam is provided on its sides with knee brackets 2· presenting flanges 3, the outer faces whereof are in substantial alinement with the end of the beam, as indicated. To these flanges 3, there is attached an angle bracket 4 which extends transversely of the beam, as shown in Fig. 2. This angle bracket 4 presents a horizontal flange 5, upon which there is rigidly attached a laterally projecting draft arm 6. This arm is in the form of a flat bar, as shown, the outer end of the said bar being provided with four openings 7, for a purpose which will appear hereinafter.

On the upper side of the draft arm 6, at the angle bracket 4, a brace arm 8 is attached by means of a bolt 9, as shown. This arm inclines upwardly away from the beam 1, and is disposed over the draft arm 6. The outer extremity of the brace arm is bent into parallelism with the arm 6, and at this point the draft arm and brace arm are connected by a stud or post 10, as shown. Adjacent to this stud 10, and on the side toward the beam 1, a tie brace 11 is attached. This brace consists simply of a rod having a turnbuckle 12 therein for tightening it. The forward end of the brace is attached by links 13 to the draft arm, from which point the brace extends rearwardly in an inclined position. The rear end of the brace is attached to an anchor plate 14 which is secured by means of a clip 15 to the beam 1, as indicated in Fig. 4.

The inner end of the draft arm 6 is provided with an opening 16, and in this opening a chain 17 is attached. This chain extends forwardly, as indicated. A similar chain 18 is attached in one of the openings 7, and these chains are connected by a draft ring 19. To this draft ring 19, a quadrupletree 20 is attached, and to the arms of this quadrupletree, doubletrees 21 are attached, each doubletree being provided with two swingletrees 22, as indicated in Fig. 1. The chains 17 are preferably one link shorter than the chain 18 so as to bring the ring 19 nearer to the beam 1 than it would otherwise be; the ratio of the chains is 16 to 17. If it is desired to bring the ring 19 even nearer to the beam, this can be accomplished by attaching the end of the chain 18 in one of the inner openings 7.

In the operation of the device, the draft arm 6 is made quite rigid by the brace 8 against a lateral deflection, that is, against a flexion up or down at an intermediate point. In addition to this, the arm is braced in a horizontal plane by means of the diagonal or tie brace 11, which prevents the arm from being displaced in a forward direction. In this way a very rigid draft arm is formed at the forward end of the beam, which is comparatively light and readily applied. The bar 6 may be attached in a reversed position if desired, that is, so that it projects toward the right instead of toward the left.

Having thus described my invention, I claim as new and desire to secure by Letters Patent,—

1. In a draft mechanism, in combination, a beam, knee brackets attached to the side faces of said beam, a laterally projecting draft arm, means for attaching said draft arm to said knee brackets, a brace arm attached to said draft arm near said beam and diverging from said draft arm in the direction of the free end thereof, a stud supporting the outer end of said brace arm removed from said draft arm, and a diagonal brace connecting said draft arm with said beam.

2. In a draft mechanism, in combination, a beam, knee brackets attached to opposite sides of said beam, an angle bracket attached to said knee brackets and extending transversely of said beam, said angle bracket having a substantially horizontal flange, a draft arm consisting of a flat bar attached to said flange and projecting laterally, a brace-arm attached to said draft arm near said beam and diverging therefrom toward the free end of said draft arm, a stud projecting from said draft arm at an intermediate point on the length thereof and rigidly attached to the end of said brace arm, a diagonal brace connecting said draft arm with said beam, and means for adjustably attaching draft animals to said draft arm.

In testimony whereof I have signed my name to this specification in the presence of the subscribing witnesses.

HERMAN MESSMAN.

Witnesses:
JOHN V. CARDOSI,
JAMES T. BURNS,
FRANK J. BURNS.